United States Patent
Tanury

[11] Patent Number: 6,019,255
[45] Date of Patent: Feb. 1, 2000

[54] MODULAR ADHESIVE SEALANT HEATING SYSTEM

[76] Inventor: Bryan Tanury, 630 Live Oak Dr., Rochester Hills, Mich. 48309

[21] Appl. No.: 09/064,541

[22] Filed: Apr. 22, 1998

[51] Int. Cl.[7] .............................. B67D 5/62; F27B 14/00; E01C 19/45

[52] U.S. Cl. ................ 222/146.5; 219/421; 126/343.5 A

[58] Field of Search .......................... 222/146.5; 219/420, 219/421, 422, 423–425; 1226/343.5 R, 343.5 A

[56] References Cited

U.S. PATENT DOCUMENTS

| | | |
|---|---|---|
| D. 269,349 | 6/1983 | Belter . |
| 3,827,603 | 8/1974 | Reighard et al. ..................... 222/146.5 |
| 3,876,105 | 4/1975 | Kelling .............................. 222/146.5 X |
| 4,073,409 | 2/1978 | Gardner et al. . |
| 4,405,063 | 9/1983 | Wydro et al. . |
| 4,456,151 | 6/1984 | Lewellen . |
| 4,479,590 | 10/1984 | Slautterback . |
| 4,485,941 | 12/1984 | Frates et al. . |
| 4,485,942 | 12/1984 | Petrecca . |
| 4,488,665 | 12/1984 | Cocks et al. . |
| 4,598,842 | 7/1986 | Sticher et al. . |
| 4,613,062 | 9/1986 | Walter et al. . |
| 4,635,820 | 1/1987 | Marshall . |
| 4,641,764 | 2/1987 | Faulkner, III . |
| 4,667,850 | 5/1987 | Scholl et al. ...................... 222/146.5 X |
| 4,771,920 | 9/1988 | Boccagno et al. ................... 222/146.5 |
| 4,790,455 | 12/1988 | Dieringer et al. . |
| 4,883,200 | 11/1989 | Miller et al. ...................... 222/146.5 X |
| 5,680,963 | 10/1997 | Brusko et al. ........................ 222/146.5 |

Primary Examiner—Kevin Shaver
Assistant Examiner—Keats Quinalty
Attorney, Agent, or Firm—Dinnin & Dunn, P.C.

[57] ABSTRACT

A hot melt assembly for melting adhesives and sealants including a modular melt tank for housing the adhesive/sealants that is removably secured to a heating plate to allow removal of the melt tank for cleaning, repairing or replacing without removing additionally attached components. An elastic O-ring provides the necessary fluid seal between the heating plate and melt tank.

10 Claims, 3 Drawing Sheets

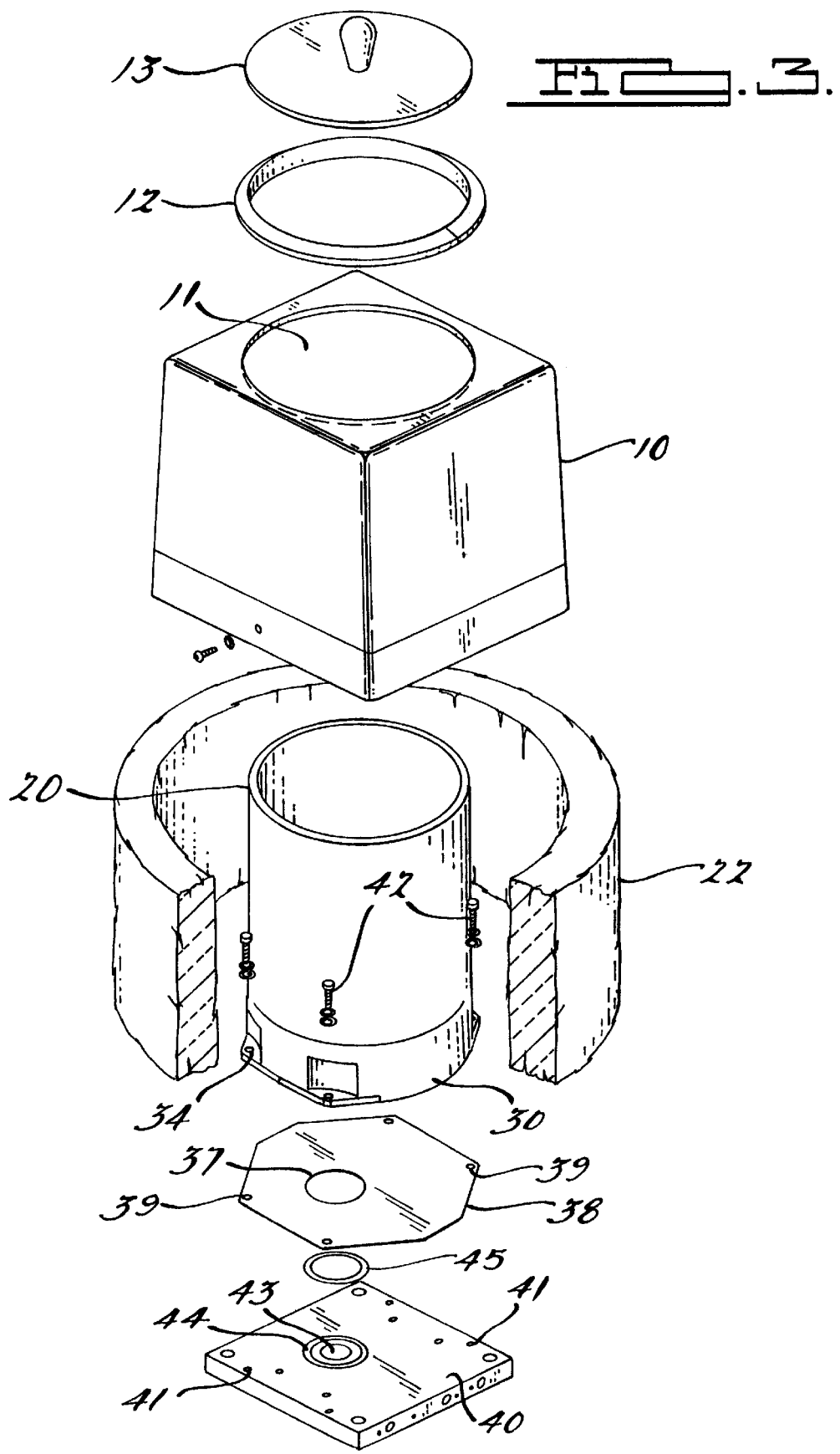

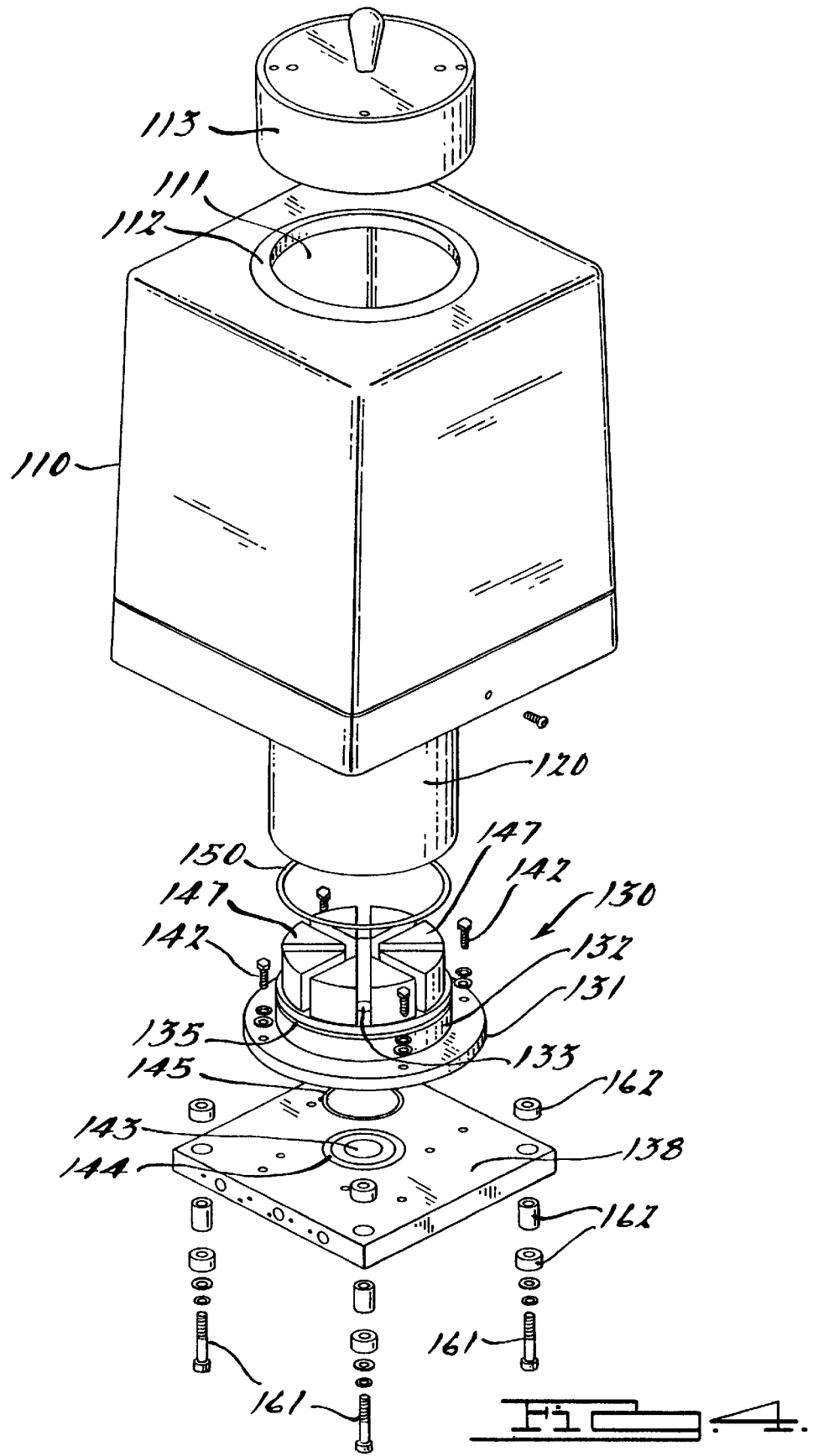

MODULAR ADHESIVE SEALANT HEATING SYSTEM

FIELD OF THE INVENTION

The present invention broadly relates to hot melt assemblies used to melt and apply adhesives and sealants for packaging and other industrial applications, and more particularly, a modular designed melt tank releasably secured to the hot melt assembly.

BACKGROUND OF THE INVENTION

For certain applications of hot melt adhesives and sealants, the adhesive/sealant is transported and supplied in bulk form, typically in small slats, pellets, blocks, pillows, or chips. These products are solid at room temperature, and therefore, need to be heated to a liquid state for application. The product is inserted in a melt tank, heated to a liquid or flowable semi-liquid state, and then pumped through a heated hose to a heated manual or automatic gun for application. This type of hot melt dispensing system is commonly used in packaging (cereal boxes), automotive applications (headliners), and various other industrial applications.

The tank for melting the adhesive/sealant is typically a single composite unit with attached components such as heating elements, sensors and pumping units. The melt tank is a cast or extruded aluminum box or cylinder with an opening at the top sufficient to accept quantities of the bulk adhesive. The melt tank capacity is routinely measured in pounds and can vary in maximum capacity from seven pounds to 100 pounds. However, some melt tanks can be smaller or larger in capacity.

The solid bottom of the typical melt tank is drilled and reamed to accept cartridge style heating elements or has cast-in heating elements. These heating elements are needed to sufficiently heat the bottom and sides of the tank to transfer the necessary heat through the metal to melt the adhesive/sealant to the desired liquid or flowable state. The heat created at the bottom and sides of the melt tank must also transfer into the pumping mechanism to maintain the flowable state of the adhesive/sealant. Therefore, either at the bottom or through the opening at the top of the typical melt tank, the pumping mechanism is attached to the melt tank in such a way that it comes in direct contact with the heated bottom of the melt tank. With its integral pump and heating components, the melt tank is typically bolted to and supported by a metal frame or base assembly to which all other system components are secured such as electronic temperature and process controls. This assembly of the typical melt tank makes removing the melt tank difficult, particularly for cleaning.

Repeated use of the melt tank causes a residue of char and degraded adhesive resins to build up primarily along the inside wall and bottom of the melt tank. This build up eventually finds its way through the pump, hoses and application guns to affect the overall performance of the equipment and the purity of the adhesive/sealants. The problems encountered include gummed up filters, premature pump wear, clogged hoses and dripping gun nozzles. Even used on a regular basis, commercially available tank purge and flushing materials do not clean the melt tank sufficiently. Char and burnt resins continue to build up. The best way to clean the melt tank is to remove it from the system and have it baked or chemically stripped and cleaned, and finally re-installed. Accordingly, removal of the melt tank from the rest of the assembly is essential to thoroughly clean the melt tank thereby maintaining a high quality product.

However, in existing systems, the melt tank side walls are welded to the surface of a heating plate. Inserted in the heating plate is the previously mentioned cartridge style heating elements. Bolted and attached to the bottom of the heating plate is a complete pump assembly with a flow control device. The melt tank with attached heating plate is bolted to the steel base assembly using hardened steel bolts and heat insulating washers. Removing the melt tank for cleaning or replacement requires the removal of the heating elements, temperature sensing device, pump assembly with the flow control device, and removal of the steel bolts and heat insulating washers. This process requires significant time and effort resulting in significant down time for the equipment.

Even after the melt tank is removed from the steel base assembly, access to the interior of the tank is cumbersome making cleaning still difficult because the heating plate is welded to the tank. Additionally, replacement of the melt tank requires replacing the bottom heating plate or else significant labor would be required to unweld, and reweld, the tank side walls where they are joined to the heating plate.

Wherefore, it is an object of the present invention to provide a design for a melt tank which may be removed from the rest of the hot melt assembly prior to melt tank repair, cleaning and/or replacement without removing any other attached components.

Another object of the present invention is to provide a design of the melt tank which does not require replacement of the heating plate during melt tank repair, cleaning and/or replacement.

Still another object of the present invention is to provide melt tank design that does not require the unwelding, and rewelding, of the tank side walls to the heating plate during melt tank repair, cleaning and/or replacement.

SUMMARY OF THE INVENTION

According to the present invention, the forgoing and other objects and advantage are attained by a modular designed melt tank from which the attached components do not have to be removed prior to melt tank repair, cleaning and/or replacement. Instead, the melt tank is removably secured to the hot melt assembly having removable side walls easily separated from the heating plate. The side walls of the melt tank are bolted with respect to the heating plate. An O-ring provides the necessary fluid seal between the heating plate and the tank side walls.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

FIG. 3 is an exploded view of the present invention with the melt tank of FIG. 1 positionally related to other components.

FIG. 4 is an exploded view of a second embodiment of the present invention.

DESCRIPTION OF THE PREFERRED EMBODIMENT(S) AND BEST MODES OF CARRYING OUT THE INVENTION

Generally, the present invention includes a pump, heating element, melt tank and melt grid. Two embodiments of the present invention are described. However, the essential differences between the embodiments are the designs of the melt tank/tank sleeve and melt grid/tank pad and the structural relationship between the two. Accordingly, each embodiment has many components in common, which will be explained subsequently.

Figure 1:
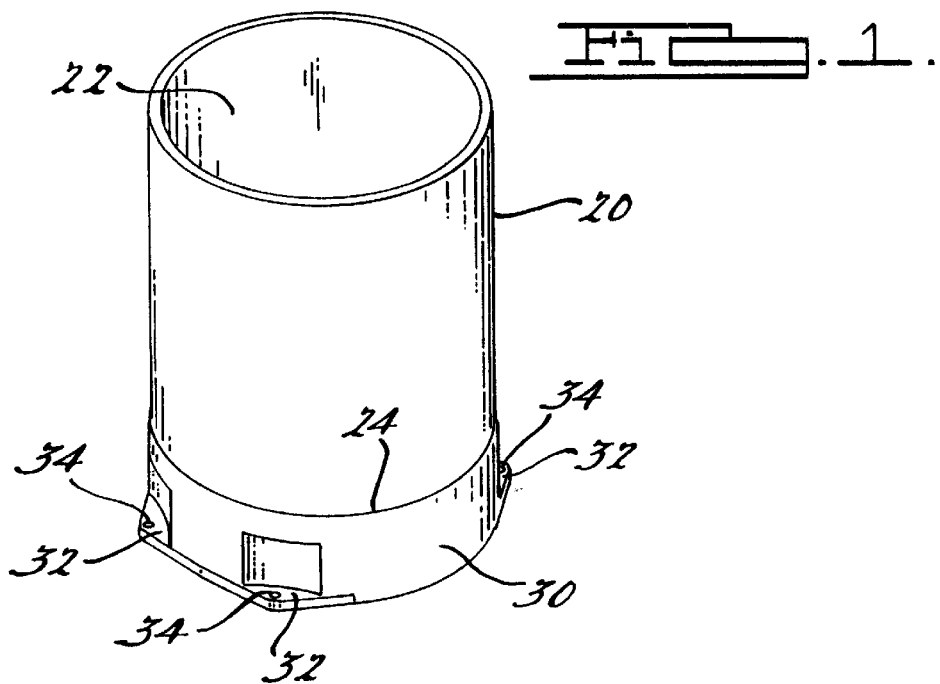
FIG. 1 is a perspective view of one embodiment of the present invention.

Referring now in greater detail to the drawings, FIG. 1 illustrates a first embodiment of the present invention. A cylindrical melt tank 20 is cast or extruded from aluminum. One end 22 of the melt tank 20 is open to receive bulk adhesive or sealant. The opposite end is a circular edge that mates with a circular edge of a melt grid 30 to be welded 24 forming one unit. It should be noted that the melt tank 20 and melt grid 30 could be extruded or cast as one piece negating the welding process.

Otherwise, the melt grid 30 is also cast or extruded from aluminum. The melt grid 30 is generally cylindrical with smaller height dimensions than the melt tank 20. The exterior surface of the melt grid 30 has four laterally extending flanges 32 (only three shown in FIGS. 1 and 3) adjacent the end of the melt grid 30 opposite the edge mated with the melt tank 20. Each flange 32 has an aperture 34 to receive bolts (shown in FIGS. 3 and 4).

Figure 2:
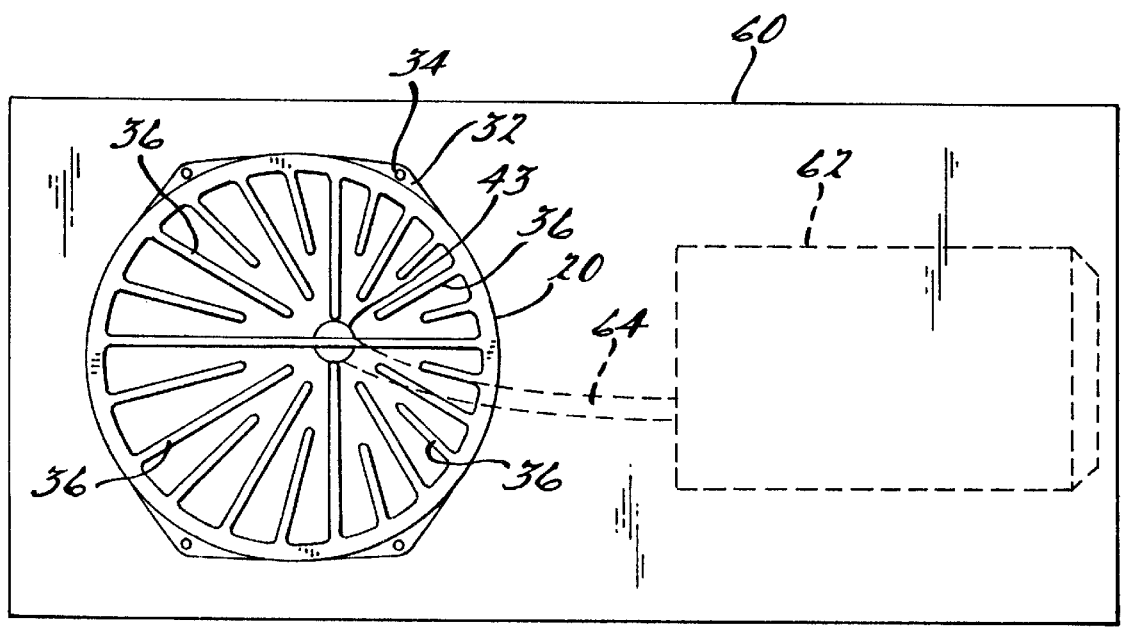
FIG. 2 is a top plan view of FIG. 1 with the melt tank secured to a metal base.

As demonstrated in FIG. 2, the melt grid 30 includes a plurality of veins 36 integrally extending radially inward from the interior surface of the melt grid 30 and generally having the same height dimensions as the melt grid 30.

For ideal cleaning purposes, the melt grid 30 will not have a bottom so that during the cleaning process, a pressurized stream of water may pass into the melt tank 20 and through the melt grid 30 to wash any impurities and build up from the melt tank 20 and melt grid 30. A graphoil gasket 38 seals the bottom of the melt grid 30. A heating plate 40 having a flat surface rests against the opposite side of the graphoil gasket 38 and is secured to the melt grid 30 (see FIG. 3) by bolts 42 that extend through the apertures 34 and corresponding openings 39, 41 of the graphoil gasket 38 and heating plate 40, respectively, with the graphoil gasket 38 in between. The graphoil gasket 38 and heating plate 40 each have aligned drain holes 37, 43. The heating plate 40 includes an annular groove 44 encircling the drain hole 43 of the heating plate 40 to receive an elastic O-ring 45 that provides the necessary fluid seal between the heating plate 40 and melt grid 30.

With the melt grid 30 having no bottom, the purpose of the graphoil gasket 38 is threefold: to seal the bottom of the melt grid 30 as previously stated; to improve the thermodynamic flow between the melt grid 30 and heating plate 40; and to prevent direct contact between the heating plate 40 and bulk adhesive or sealant. To improve thermodynamic flow at the expense of the cleaning process, a bottom (not shown) could be provided for the melting grid 30. The bottom would have a flat exterior surface to rest against the graphoil gasket 38, a third drain hole (not shown) aligned with drain holes 37, 43, and an interior surface ideally biased from the melt grid 30 to the third drain hole.

FIG. 4 illustrates a second embodiment of the present invention. A tank pad 130 has three generally cylindrical portions, each extending vertically from one portion to the next and each portion having a smaller radius than the portion from which it extends.

The first portion of the tank pad 130 is a tank base 131 with one side a flat surface to rest against a heating plate 138, each secured to the other by bolts 142 extending through the tank base 131 into the heating plate 138. A second side has an elevated cylindrical throat portion 132 on the second portion. The tank base 131 and throat portion 132 have a centered drain hole 143.

Furthermore, the throat portion 132 includes a circumferential groove 135 to receive an elastic O-ring 150 and a top surface having a bias downward to the drain hole 143 from the vertical surface. Extending upward from this biased surface of the throat portion 132 is the third portion of the tank pad 130, a plurality of rectangular veins 147 which also extend radially from the drain hole 143.

A tank sleeve 120, having a hollow cylindrical shape, has an interior diameter slightly larger than the throat portion 132 to slidingly engage the throat portion 132 with the bottom edge of the tank sleeve 120 resting on the tank base 131. The elastic O-ring 150 provides a fluid tight seal between the tank sleeve 120 and tank pad 130.

Both embodiments of the present invention include a pump assembly 62 (FIG. 2) having an inlet 64 bolted to the bottom of the heating plates 40, 138 at the drain hole opposite the melt grid 30 or melt pad 130. A flow control device such as a heated manual or automatic gun (neither shown) is attached to the pump assembly 62 for application of the adhesive/sealant.

A steel base 60 (see FIG. 2) is used to support each embodiment with hardened steel bolts 161 (see FIG. 4) and heat insulating washers 162 securing the heating plates 40, 138 to the steel base 62. Any additional elements such as a temperature sensing device and supports (neither shown) for the pump assembly 62 are attached to the steel base 60.

An insulation blanket 22 (shown only for first embodiment of FIG. 3) surrounds the exposed surface of the melt tank 20 and is removably secured thereon by adhesive strips (not shown) to provide minimal heat degradation. Tank shrouds 10, 110 releasably encloses the insulation blanket 22 and melt tank/tank sleeve 20, 120 for protection from the environment and to prevent contact with skin. The tank shrouds 10, 110 further include openings 11, 111 to communicate with the top of the melt tank 20 or tank sleeve 120. Seals 12, 112 affixed to the periphery of the openings 11, 111 provide seats for lids 13, 113 to cover the openings 11, 111 and provide easy loading of adhesive/sealant.

With both embodiments having the adhesive/sealant held in tanks that are releasably secured to the heating plates, the problems with current hot melt assemblies are alleviated. Accordingly, only the tanks need to be removed from the rest of the assembly for maintenance and cleaning. Additionally, removal of the tanks from the heating plates without breaking welding bonds prevents damage to the heating plate. Finally, the tank/sleeve can easily be cleaned since removal and design allow for water to be sprayed in and through the tanks releasing any build up of adhesives/sealants from the interior walls.

What is claimed is:

1. A hot melt assembly comprising:

a pump having an inlet;

a heating element having an aperture communicating with the inlet of said pump; and a tank pad having a raised tank base supported upon said heating element, a tank sleeve supported upon said tank pad and slidingly engaging said tank base and releasably secured thereto.

2. The hot melt assembly of claim 1 wherein said tank base has an outlet communicating with said heating element aperture, said tank base further includes a plurality of veins supported thereupon extending radially from said outlet.

3. The hot melt assembly of claim 1 wherein said tank pad further includes at least one outwardly extending flange, said flange having at least one aperture; and said heating element includes at least one mating aperture for receiving fastening means.

4. The hot melt assembly of claim 1 wherein the heating element further includes an annular groove about said aperture and the assembly includes an O-ring located in said annular groove.

5. The hot melt assembly of claim 1 further including a thermally conductive gasket thermally connecting said heating element and said melt pad.

6. The hot melt assembly of claim 1 further including an insulation blanket surrounding the exposed surface of said tank sleeve and a tank shroud enclosing said insulation blanket, said tank shroud having an opening communicating with the top of said tank sleeve, said tank shroud further includes a lid to cover said opening.

7. The hot melt assembly of claim 6 wherein the tank base further includes a circumferential groove about the outer surface and the assembly includes an O-ring located in said circumferential groove.

8. A hot melt assembly comprising:

a pump having an inlet;

a heating element having an aperture communicating with the inlet of said pump and an annular groove about said aperture, the assembly further includes an O-ring located in said annular groove, and said heating element further comprises at least one mating aperture; and a melt tank comprising at least one outwardly extending flange, said flange having at least one aperture aligned with the mating aperture of said heating element for receiving fastening means, said melt tank further includes an outlet communicating with said heating element aperture and has veins supported thereupon extending radially from said outlet; said assembly further includes a thermally conductive gasket thermally connecting said heating element and said melt tank.

9. The hot melt assembly of claim 8 further including an insulation blanket surrounding the exposed surface of said melt tank and a tank shroud enclosing said insulation blanket, said tank shroud having an opening communicating with the top of said melt tank, said tank shroud further includes a lid to cover said opening.

10. A hot melt assembly comprising:

a pump having an inlet;

a heating element having an aperture communicating with the inlet of said pump;

a tank pad having a raised tank base supported upon said heating element and having an outlet communicating with said heating element aperture, said tank further including a plurality of veins supported thereupon extending radially from said outlet; and a tank sleeve supported upon said tank pad and releasably secured thereto.

* * * * *